(No Model.)

G. C. BOURDEREAUX.
TROLLEY WHEEL.

No. 513,076. Patented Jan. 23, 1894.

Witnesses
A. Keithley
E. Johnson

Inventor
George C. Bourdereaux
By
T. W. Thurlow Att'ys

UNITED STATES PATENT OFFICE.

GEORGE C. BOURDEREAUX, OF PEORIA, ILLINOIS.

TROLLEY-WHEEL.

SPECIFICATION forming part of Letters Patent No. 513,076, dated January 23, 1894.

Application filed January 31, 1893. Serial No. 460,447. (No model.)

*To all whom it may concern:*

Be it known that I, GEORGE C. BOURDEREAUX, a citizen of the United States, residing at Peoria, in the county of Peoria and State of Illinois, have invented certain new and useful Improvements in Trolley-Wheels; and I do hereby declare the following to be a full, clear, and exact description of the invention, such as will enable others skilled in the art to which it appertains to make and use the same.

This invention relates to improvements in trolley wheels for electric cars.

The object of the invention is to provide a peculiarly constructed bearing within the wheel which will prevent any binding and unnecessary friction therein.

The trolleys ordinarily used are of such construction as to have too much friction and thus cause a great wearing and the wheel is useless within one or two months.

Figure 1:
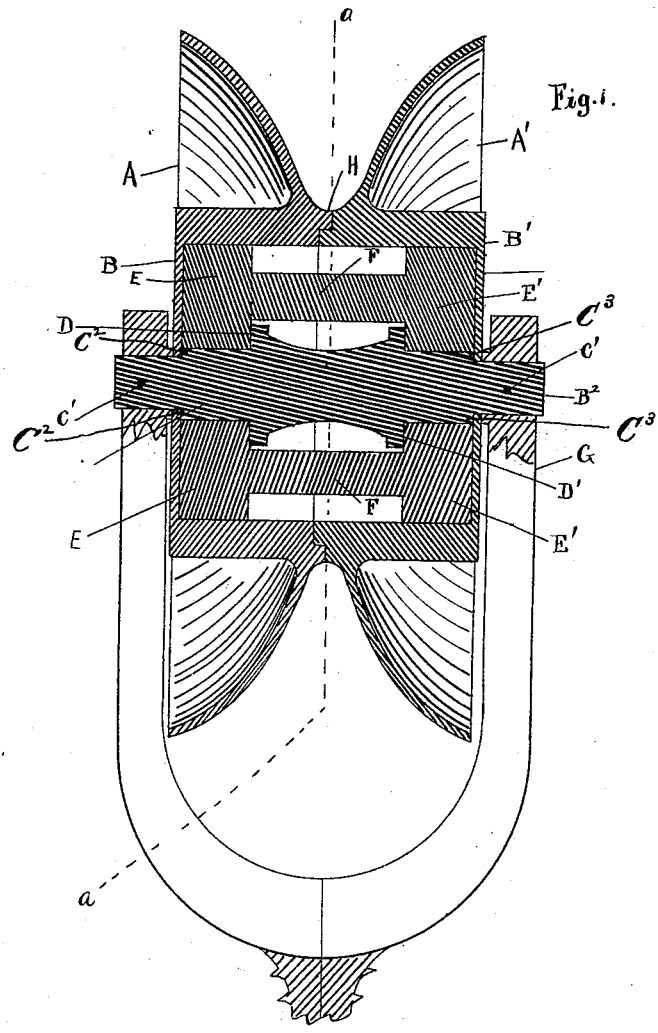
Figure 2:
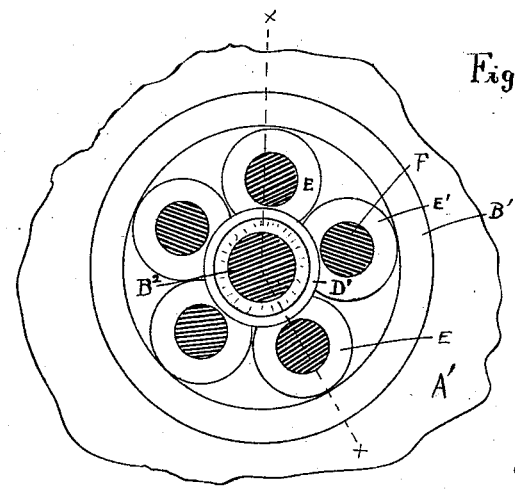

In the drawings, Figure 1 is a sectional view through the length of shaft of the wheel, through dotted line $x\ x$ Fig. 2. Fig. 2 is a cross section of the bearings and shaft through dotted line $a\ a$ Fig. 1.

A and A' represent the two halves of the trolley wheel each half being so constructed as to form a circular hollow casing B and B' respectively, each of which extends from the middle of the width of the wheel out on a line with the outer edge of the wheel. The wheel being in halves, a shoulder H is turned up on the inner edge of the casing B which fits into a groove turned in the casing B' to hold the said halves steadily in place. The two halves when put together form a casing completely inclosing the roller bearings. The groove bearing on the wire may be of any good shape to work to the best advantage on the overhead wire. A central shaft $B^2$ is held rigidly in a fork G, by pins C' C' and shoulders $C^2$ and $C^3$ bearing against the inner side of the walls of the casings B and B' respectively. The shaft $B^2$ also has the flanges D and D' made integral therewith. Placed between these flanges D and D' and the casings B and B' respectively, are the enlarged ends E and E' of the rollers F, which bear upon the shoulders $C^2$ and $C^3$ and just pass easily between the flanges D and D' and the walls of the casings. There may be any number of these rollers desired, depending of course upon the size of the wheel and the interior diameter of the casings.

In use the wheel revolves and bears on the rollers F and the rollers F in turn bear on the shaft $B^2$ forming a good smoothly operating device well fitted to the work required of it.

I claim—

1. In a trolley wheel, the combination of a casing comprising the halves A and A' forming the trolley wheel proper, each of said halves having a containing case made integral therewith and adapted to occupy a position adjacent to one another to form a dust proof containing case, said halves A and A' being mounted centrally upon a flanged shaft $B^2$ secured in a fork G and a series of flanged or headed rollers E adapted to roll around said shaft $B^2$ within said casing substantially as set forth and described.

2. In a trolley for electric cars, the fork G the two halves A and A' forming a wheel and provided with the casings B and B' respectively, a shaft $B^2$ rigidly mounted in said fork G and supporting the said wheel, said shaft provided with the shoulders $C^2$ and $C^3$ and the flanges D and D' in combination with the rollers F having the ends E engaging with the said shoulders $C^2$ and $C^3$ of the shaft $B^2$ to form a bearing or bearings for the trolley wheel substantially in the manner and for the purposes herein set forth and described.

3. A trolley for electric cars comprising two separable portions or halves fitted together to form the trolley wheel and a casing for the trolley bearings, a series of rollers inclosed by said casing and having enlarged bearing ends, and a central bearing shaft constructed to engage the enlarged ends of said series of rollers substantially in the manner and for the purposes herein set forth and described.

In testimony whereof I affix my signature in presence of two witnesses.

GEO. C. BOURDEREAUX.

Witnesses:
F. O. CUNNINGHAM,
C. JOHNSON.